E. FLAGG.
WIND SHIELD.
APPLICATION FILED JUNE 22, 1908.
934,152.
Patented Sept. 14, 1909.
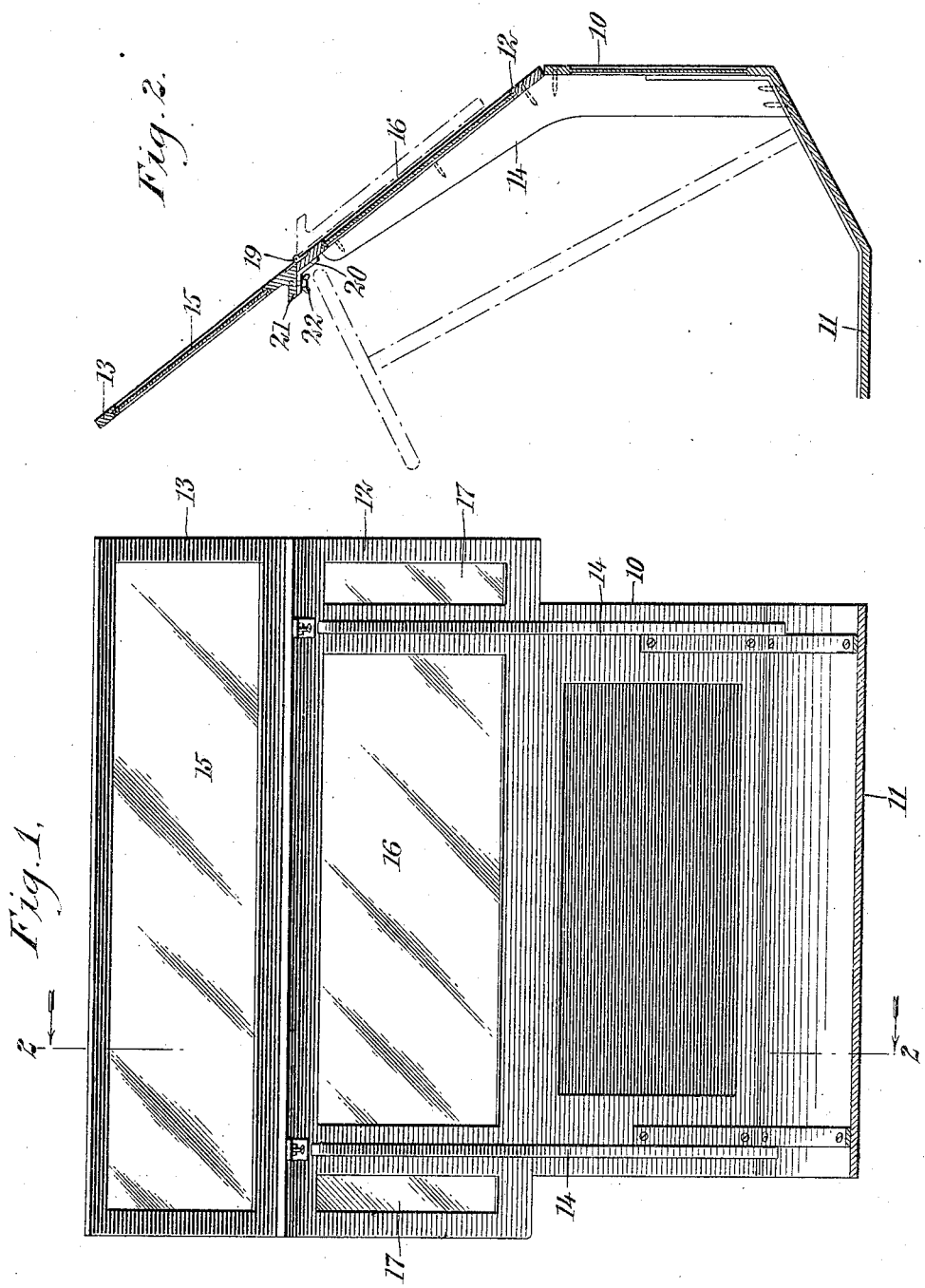
WITNESSES
Edward Thorpe
C. W. Fairbank
INVENTOR
Ernest Flagg
BY Munn Co.
ATTORNEYS

UNITED STATES PATENT OFFICE.

ERNEST FLAGG, OF NEW YORK, N. Y.

WIND-SHIELD.

934,152. Specification of Letters Patent. Patented Sept. 14, 1909.

Application filed June 22, 1908. Serial No. 439,718.

*To all whom it may concern:*

Be it known that I, ERNEST FLAGG, a citizen of the United States, and a resident of the city of New York, borough of Manhattan, in the county and State of New York, have invented a new and Improved Wind-Shield, of which the following is a full, clear, and exact description.

This invention relates to certain improvements in wind shields adapted for use on vehicles, and more particularly to that type of wind shield used upon motor vehicles and forming an upper extension of the dashboard thereof.

The object of the invention is to so construct the wind shield as to greatly reduce the wind pressure and the resistance to the rapid movement of the car, and at the same time effectively protect the occupants of the car.

A wind shield constructed in accordance with my invention and formed of two sections, one of which is foldable to a position adjacent the other section, may rely solely upon the action of gravity to retain the movable section in either of its two positions, which is not ordinarily possible with a wind shield held in a vertical position.

Reference is to be had to the accompanying drawings, forming a part of this specification, in which similar characters of reference indicate corresponding parts in both the figures, and in which—

Figure 1 is an elevation showing the rear side of a wind shield constructed in accordance with my invention, and Fig. 2 is a section on the line 2—2 of Fig. 1.

In the specific construction illustrated, I employ a dashboard 10 secured to the floor 11 of the car in any suitable manner in automobile construction, extending upwardly and rearwardly therefrom. At the upper edge of the dashboard, I mount my improved wind shield formed of a stationary section 12 and a movable or folding section 13 hinged to the upper edge of the latter. The lower section 12 is rigidly secured to the dashboard 10 by means of two wooden brackets, braces or knees, extending from adjacent the lower edge of the dashboard to adjacent the upper edge of the stationary wind shield section 12. The upper section is provided with a glass panel or transparent portion 15.

As shown, the wind shield is of somewhat greater length than the dashboard, and the wooden brackets or braces 14 adjacent the ends of the dashboard subdivide the lower section of the wind shield into three divisions, each of which may, if desired, be provided with a glass panel or transparent portion, the center division having a large transparent portion 16 and the end divisions having smaller transparent portions 17. The two sections are secured together by suitable hinges 19, the pintle points of which are disposed adjacent the front surface of the wind shield. The rear surface of the lower section adjacent its upper edge, is provided with outwardly-extending braces or brackets 20, and the upper section adjacent its lower edge, is provided with a rearwardly-extending flange or bracket 21. The flange or bracket 21 engages with the bracket 20 when the section 13 is in its upper or raised position, and the two brackets may, if desired, be secured together by any suitable fastening means, as, for instance, screws 22. Normally, these screws would not be necessary, as due to the inclination of the wind shield and the disposition of the hinges 19, the upper section will remain in position under the action of gravity. When the upper section is swung forwardly and downwardly to the position indicated in dotted lines in Fig. 2, it may also be held in place by any suitable form of fastener, but normally no such fastener would need be employed, as said section will be held in this position also by the action of gravity.

The upper surface of the bracket 20 and the under surface of the bracket 21, may extend at any desired angle to the plane of the shield, but as illustrated, they are disposed in a substantially horizontal plane to prevent leakage of water through the joint.

Having thus described my invention, I claim as new and desire to secure by Letters Patent:

1. A wind shield for vehicles having a lower section extending transversely of the vehicle and inclined rearwardly, and an upper section journaled upon said first-mentioned section and movable to a position in alinement therewith or to a position adjacent thereto and substantially parallel therewith, the upper edge of said lower section and the adjacent edge of the upper section lying in horizontal planes when said upper section is in either of its two positions and the journal connecting said sections being adjacent the front or upper surface of the shield.

2. A wind shield for vehicles having a lower section extending transversely of the vehicle and inclined rearwardly, and an upper section journaled upon said first-mentioned section and movable to a position in alinement therewith or to a position adjacent thereto, each of said sections having laterally-extending flanges presenting surfaces lying in a horizontal plane and contacting with each other when said sections are in alinement.

3. A wind shield for vehicles having a lower section extending transversely of the vehicle and inclined rearwardly, an upper section journaled upon said first-mentioned section and movable to a position in alinement therewith or to a position adjacent thereto, each of said sections having laterally-extending flanges presenting surfaces lying in a horizontal plane and contacting with each other when said sections are in alinement, and means in engagement with said flanges for locking said sections against relative movement.

In testimony thereof I have signed my name to this specification in the presence of two subscribing witnesses.

ERNEST FLAGG.

Witnesses:
A. T. SUTCLIFFE,
HERBERT A. THORPE.